(No Model.)
N. CORNELIUS.
FLOUR MILL.
No. 410,878. Patented Sept. 10, 1889.
Fig. I.
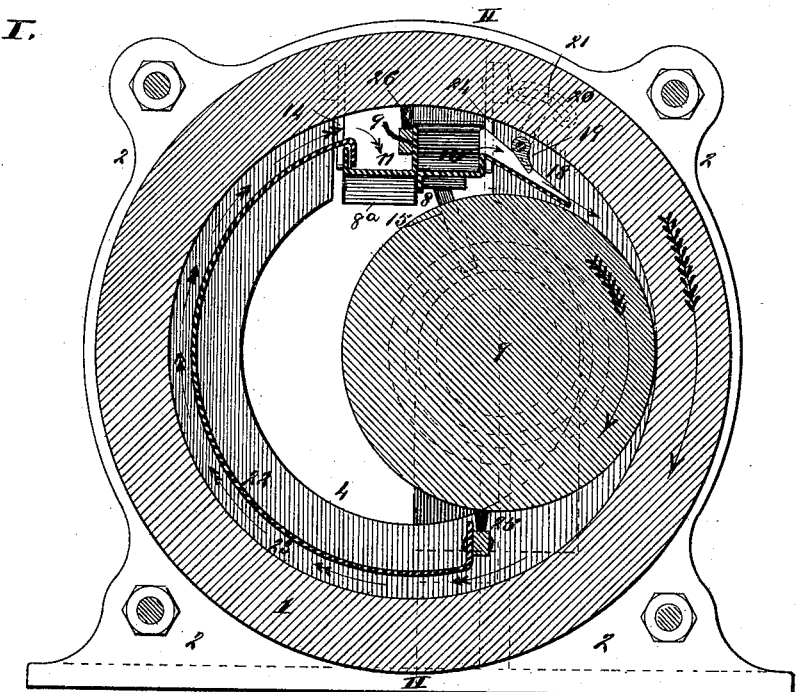
Fig. II.
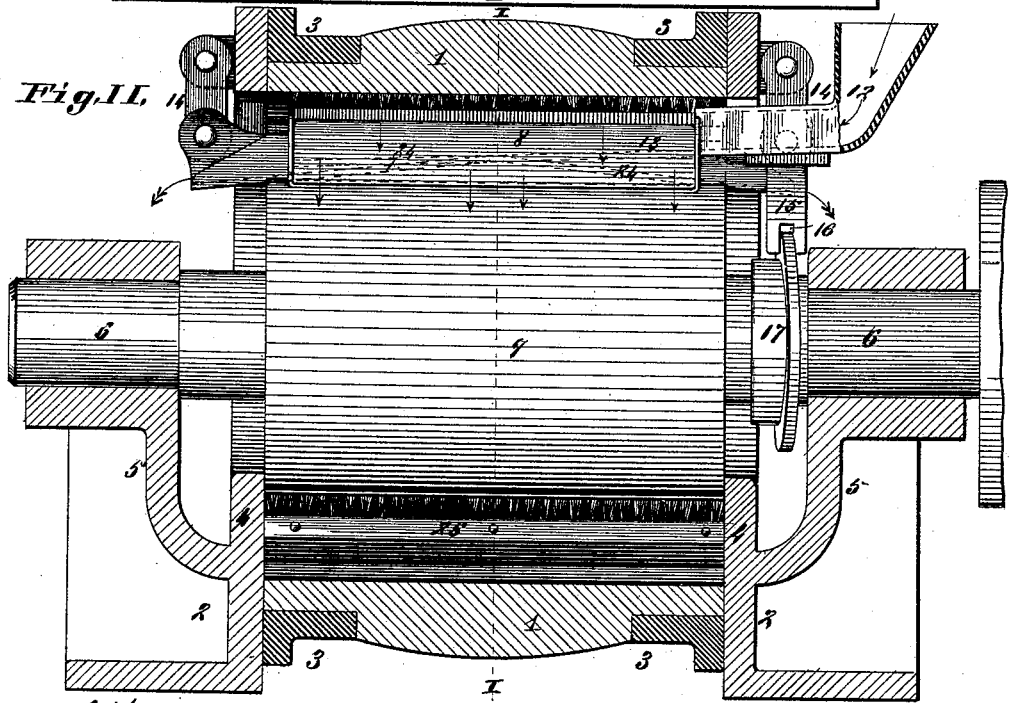
Attest:
Charles Pickles,
E. Arthur.
Inventor:
Nicholas Cornelius
By Knight Bros
atty's

UNITED STATES PATENT OFFICE.

NICHOLAS CORNELIUS, OF ST. LOUIS, MISSOURI, ASSIGNOR OF TWO-THIRDS TO HENRY STANLEY AND EMIL C. TEUSCHER, BOTH OF SAME PLACE.

FLOUR-MILL.

SPECIFICATION forming part of Letters Patent No. 410,878, dated September 10, 1889.

Application filed March 28, 1889. Serial No. 305,095. (No model.)

*To all whom it may concern:*

Be it known that I, NICHOLAS CORNELIUS, of the city of St. Louis, in the State of Missouri, have invented a certain new and useful Improvement in Flour-Mills, of which the following is a full, clear, and exact description, reference being had to the accompanying drawings, forming part of this specification, and in which—

Figure I is a transverse section illustrative of my invention, this section taken on line I I, Fig. II. Fig. II is a vertical longitudinal section taken on line II II, Fig. I.

My invention relates to that class of flour-mills in which is employed a cylinder, and an eccentrically-arranged roller within the cylinder—as, for instance, as shown in the patent granted to Clayton S. Wenger on the 5th day of October, 1880, No. 232,863, and the patent granted to Henry Stanley, Emil C. Teuscher, and myself on the 15th day of November, 1887, No. 373,342.

My invention consists in features of novelty hereinafter fully described, and pointed out in the claims.

Referring to the drawings, 1 represents a rotary cylinder, which is supported by heads 2 and angle-rings 3, secured to the heads, and within which the cylinder is free to turn. The heads 2 have flanges 4, which partly inclose the ends of the cylinder, and they are provided with extensions 5, forming boxes or supports for the journals 6 of a roller 7, which is eccentrically located within the cylinder 1, as shown in Fig. I.

The manner of driving and controlling the movement of the roll and cylinder is or may be the same as that shown and described in the patent last referred to. They revolve in the same direction, as indicated by the arrows in Fig. I.

8 represents a feed-trough and 8ᵃ a discharge-trough located side by side within the upper portion of the cylinder. They are divided by a central partition 9, on one side 10 of which is the trough 8, through which the grain is fed to the machine, and on the other side 11 of which is the trough 8ᵃ, through which the stuff is conveyed from the machine.

12 represents a hopper communicating with the feed-trough 8, and the floor or bottom of this part is preferably inclined, as shown by dotted line 13, Fig. II, so that the grain will naturally move inward from the hopper 12. The troughs are agitated by any suitable means. I have shown it suspended by means of links 14 from the heads 2, and on one end is an arm or projection 15, having a notch 16 to receive an eccentric cam 17 on one of the journals 6 of the roller 7. As the roller turns, the troughs will thus be agitated and the grain discharged onto a chute 18, that delivers it between the roller and cylinder, as shown by the featherless arrows; or the chute might be dispensed with and the feed-troughs deliver directly to the cylinder and roller.

19 represents a valve located over the chute 18 to regulate the feed. It is controlled by a slotted arm 20 and set-screw 21, (see dotted lines, Fig. I,) the screw adjustably connecting the arm to one of the heads 2.

22 represents a diaphragm or apron located within the cylinder on the opposite side to the roller, and which forms a chamber 23, through which the ground stuff is carried, as shown by the double-headed arrows in Fig. I, by the movement of the cylinder and delivered into the discharge-trough. The floor or bottom of this part is preferably inclined in both directions from the middle, as shown by dotted lines 24, Fig. I, so that the stuff will be delivered in both directions for the purpose of detecting which end of the roller is set nearest to the cylinder and keeping them alike by adjusting one or the other end, as required.

25 represents a brush secured to the lower end of the apron 22 for sweeping and cleaning the face of the roller, and 26 represents a brush secured to the partition 9 for sweeping and cleaning the face of the cylinder.

A construction and arrangement of this kind, having both the feed and discharge side by side, tends to cheapen the device and renders it very simple and easy to handle, and the discharge being at the top of the cylinder elevates it into convenient position for use.

The diaphragm might in some cases be dispensed with and the centrifugal action depended on to cause the stuff to be carried up by the cylinder to the discharge.

I claim as my invention—

1. In a flour-mill, the combination of a cyl inder, a roller eccentrically arranged within the cylinder, and feed-trough and discharge-trough located side by side, substantially as set forth.

2. The combination of a cylinder, a roller eccentrically arranged within the cylinder, feed-trough and discharge-trough located side by side, and a diaphragm 22, substantially as and for the purpose set forth.

3. In a flour-mill, the combination of a cylinder, a roller eccentrically arranged within the cylinder, feed-trough and discharge-trough located side by side, a chute 18 on the delivery side of the feed-trough, and a diaphragm 22 on the discharge side of the mill, substantially as and for the purpose set forth.

4. In a flour-mill, the combination of a cylinder, a roller eccentrically arranged within the cylinder, a trough for discharging the ground stuff located at the top of the cylinder, and a diaphragm 22, substantially as and for the purpose set forth.

5. In a flour-mill, the combination of a cylinder, a roller eccentrically arranged within the cylinder, feed-trough and discharge-trough located side by side having a partition between them, the diaphragm 22, and brushes 25 and 26 on the partition and diaphragm, respectively, substantially as and for the purpose set forth.

6. In a flour-mill, the combination of a cylinder, a roller eccentrically arranged within the cylinder, and feed-trough for delivering the material and discharge-trough for discharging the ground stuff, located side by side at the top of the cylinder, substantially as and for the purpose set forth.

NICHOLAS CORNELIUS.

In presence of—
GEO. H. KNIGHT,
EDW. S. KNIGHT.